United States Patent [19]

Oakley et al.

[11] Patent Number: 5,296,019

[45] Date of Patent: Mar. 22, 1994

[54] DUST PRECIPITATION FROM AIR BY NEGATIVE IONIZATION

[75] Inventors: Clive C. Oakley, Dudley, England; Reginald R. Robertson, Winnipeg, Canada

[73] Assignee: Neg-Ions (North America) Inc., Winnipeg, Canada

[21] Appl. No.: 933,365

[22] Filed: Aug. 24, 1992

Related U.S. Application Data

[63] Continuation-in-part of Ser. No. 544,524, Jun. 28, 1990, Pat. No. 5,141,529.

[30] Foreign Application Priority Data

| Jun. 19, 1990 | [GB] | United Kingdom | 9013621 |
| Jun. 28, 1990 | [CA] | Canada | 2020114 |
| Aug. 21, 1990 | [GB] | United Kingdom | 9018368 |
| Aug. 22, 1990 | [CA] | Canada | 2023751 |

[51] Int. Cl.$^5$ .............................................. B03C 3/41
[52] U.S. Cl. ....................... 96/95; 55/385.2; 361/226; 361/231
[58] Field of Search .................. 55/150–153, 55/2, 6, 124, 126, 385.2; 361/235, 226, 230–233; 95/57, 63, 69, 70; 96/55, 57, 58, 59, 95–97

[56] References Cited

U.S. PATENT DOCUMENTS

| 2,827,394 | 3/1958 | Sherman | 55/151 X |
| 3,501,898 | 3/1970 | Lindholm et al. | 55/151 X |
| 3,973,927 | 8/1976 | Furchner et al. | 55/4 |
| 4,440,553 | 4/1984 | Helmus et al. | 55/126 |
| 4,484,249 | 11/1984 | Saurenman | 361/231 X |
| 4,642,728 | 2/1987 | Unger | 361/231 X |
| 4,750,080 | 6/1988 | Cumming et al. | 361/231 X |
| 4,757,421 | 7/1988 | Mykkanen | 361/231 |
| 4,980,796 | 12/1990 | Huggins | 55/151 X |
| 5,141,529 | 8/1992 | Oakley et al. | 55/2 |

FOREIGN PATENT DOCUMENTS

| 503495 | 7/1930 | Fed. Rep. of Germany | 55/151 |
| 2311468 | 9/1974 | Fed. Rep. of Germany | 55/151 |
| 3504187 | 9/1985 | Fed. Rep. of Germany | 55/155 |
| 483139 | 12/1975 | U.S.S.R. | 55/151 |

*Primary Examiner*—Richard L. Chiesa
*Attorney, Agent, or Firm*—Adrian D. Battison; Stanley G. Ade; Murray E. Thrift

[57] ABSTRACT

A system of precipitating dust includes providing a screen arrangement either in the form of a ceiling with walls or in the form of a canopy with the screen being penetrable by air. Inside the screen and particularly adjacent edges of the screen or the canopy there are provided negative ion emitters positioned in rows so as to generate a curtain of ions precipitating the dust from the air onto the ground for collection. Within the screen can be defined either a clean zone or the screen can be used to confine a dust producing process so as to precipitate the dust immediately adjacent the process to prevent it spreading to other areas. Emitters are provided in the form of a carbon fiber yarn which projects outwardly through openings in a channel member with the yarn being doubled back upon itself in some cases to provide a highly directional emission.

18 Claims, 10 Drawing Sheets

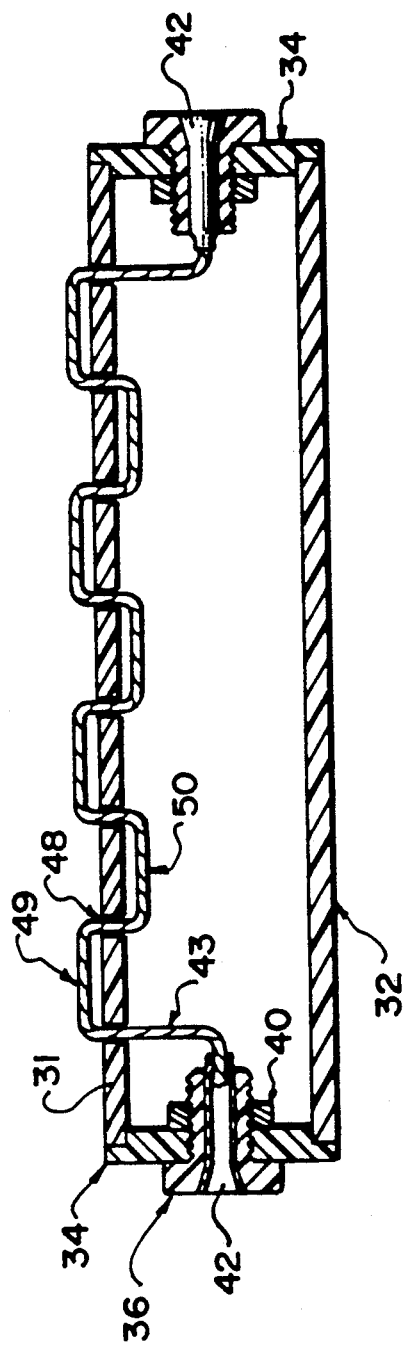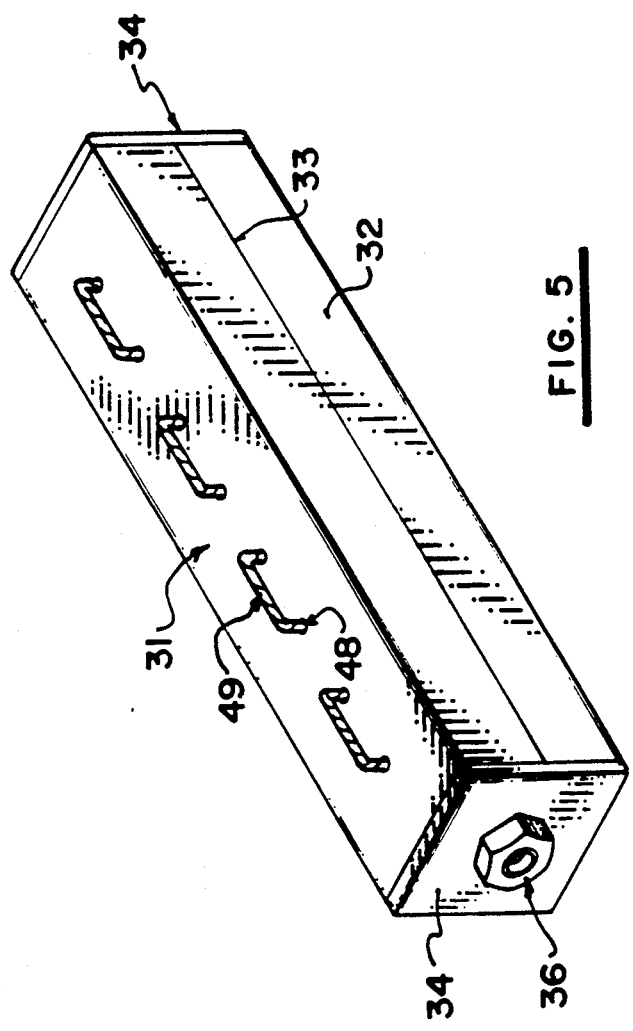
FIG. 4
FIG. 5

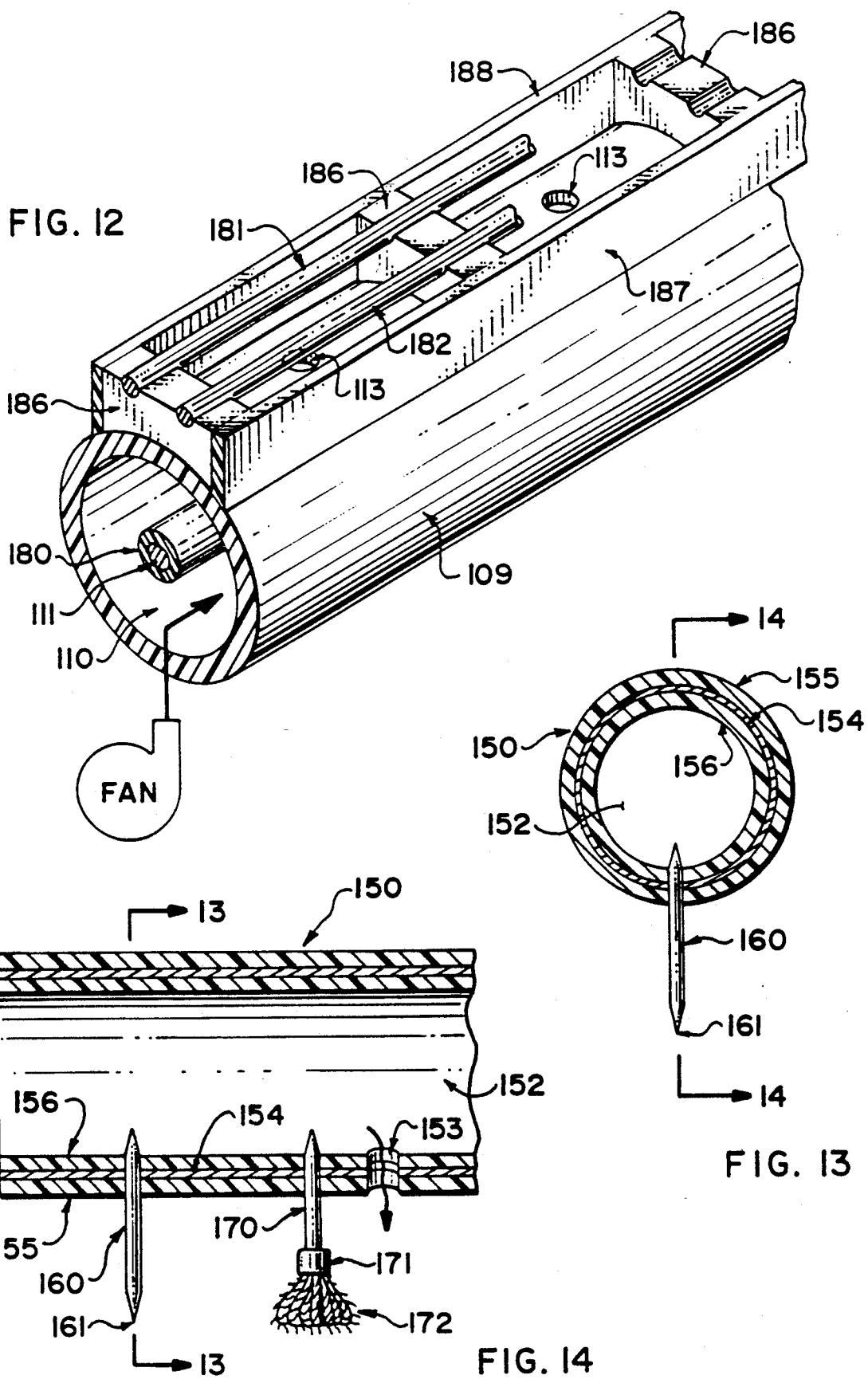

DUST PRECIPITATION FROM AIR BY NEGATIVE IONIZATION

BACKGROUND OF THE INVENTION

This application is a continuation in part of application Ser. No. 544,524 filed Jun. 28, 1990 and issued on Aug. 25, 1992 under U.S. Pat. No. 5,141,529.

This invention relates to a system for dust precipitation from air using negative ionization of the air.

The concept and prospective commercialization of negative ionization techniques has been around for decades with very little progress due to the lack of credibility arising from inappropriate, largely unsuccessful applications and clouded by exaggerated unsubstantiated claims.

At the same time the effectiveness of the technique suffered because the equipment to generate and distribute the required volumes of negative ions was initially bulky, expensive, requiring constant maintenance and was generally unreliable. These circumstances meant that the effectiveness of applications deteriorated rapidly and became totally suspect in operation.

The increasing employment of the technology is being brought about by some basic trends:

the development of equipment utilizing electronics and new materials which provide a safe, reliable, inexpensive, and non polluting source of negative ions and their distribution.

an increasing need to improve the air quality in enclosed environments which have been designed to minimize energy costs for heating, ventilating and air conditioning installations.

higher standards of safety and health in the workplace in regard to the control of micronic and submicronic pollutants identified as a health hazard.

zero defect objectives in manufacturing operations requiring more effective means to control the migration of fine dust and pollutants.

hard evidence of the effectiveness of industrial applications and increasing supportive scientific evidence as regards proper electro climate conditions for human comfort and working efficiency.

Off-shore countries, particularly Israel have maintained a fairly high level of research and development effort into pursuing the effectiveness of negative ionization techniques in a wide range of applications with considerable success.

Progress in North America in this respect, industrially at least, has been limited to the elimination of static electricity, but with strong indications of a recent revival of air treatment by modular, fan assisted negative ion dispersal units.

Conventional systems to obtain super clean air with filtration efficiencies in the micronic and sub-micronic ranges are capital intensive and expensive to run in terms of energy consumption and maintenance costs.

At the same time the systems while fully effective on the air circulated can have little influence to prevent small particulants and pollutants originating in the working plenum producing problems, apart from the inherent dilution refreshening process allowed by the cycle of air changes supplied to the area- An investigation into further prior act suggests that while the use of negative ionization techniques to improve air quality and contain dust pollution in a general way is gaining ground, there is little doubt that the level of technology available is relatively crude.

Ions are created in nature by sunlight, cosmic and terrestrial radiation and the friction of moving air and water that causes electrons to leave hydrogen, nitrogen and other molecules and to attach themselves to oxygen molecules.

Molecules with extra electrons form negative ions and have a positive effect on the environment. They neutralize odours and contribute to the clear air and the fresh smell we find in non-industrial, sparsely populated areas and at the seaside or healthy holiday resorts.

In the Prairie regions of Canada, the phenomenon best manifests itself by the invigoration experienced after a summer storm with lightning, which relieves the heavy depressing conditions which gradually build up periodically in such areas during the summer.

Positive ions are produced by car and factory exhausts, cigarette smoke, dust, soot, fumes from new processes and other domestic and industrial pollutants.

In the wide open spaces these pollutants are attracted to the negative ground and are harmlessly discharged. But in the enclosed environments of modern society-metals, cars, buildings lined and furbished with synthetic materials, etc., these pollutions cannot be discharged to earth.

At the same time the enveloping car bodies and building structures that keep the positive ions in, also keep the beneficial negative ions out because their electrical charges are absorbed by steel and concrete, bricks and siding material.

A controlled output of negative ions can be produced by electronic means/corona discharge and this source is an approved alternative for the Polonium Ionizers withdrawn from the market by 3M in February 1988. The source generation of ozone is so low as to be almost immeasurable and well below the FDA maximum of 0.05 ppm.

SUMMARY OF THE INVENTION

It is one object of the present invention to provide an improved method for cleaning air within a building using the negative ionization principles in a unique manner to obtain air which is cleaned to a high degree with low capital and maintenance costs.

The provision of the elongate multiple emitter enables a high very degree of flexibility to be used in the location and mounting of the emitters for the negative ionization treatment so that the units can be installed very quickly and at low capital cost.

The use of the screen to separate the zone to be cleaned from the remainder of the building enables a system to be used known as a "clean-zone" or as an alternative a "reverse clean-zone" in which the major dust emitting process is mounted within the zone and the negative ionization treatment used to extract the dust from the air prior to its release to the remainder of the building.

The screen is preferably formed of a material which is permeable to air and light so that the zone can be mounted within the building without regard to the location of the ventilation units and provision of lighting. In many cases, therefore, the zone can be developed at an area leaving the ventilation systems and lighting systems outside of the zone so that there is no interference whatever with the existing utilities within the building. The light and air movement necessary for ventilation can then take place through the screen with the screen and the negative ionization system cooperating to extract the dust and to prevent its penetration through the screen.

The system as installed, constantly and efficiently will precipitate about 99% of the fine dust particles and pollutants in a work area defined and isolated by specially constructed barrier screens.

With the correctly calculated and distributed negative ion density within the zone, all further migration of the precipitation micronic and submicronic particles will be effectively and continuously prevented, as a result of the electro-climate created and maintained in the "Clean Zone" area.

The emitters are preferably separated from any air flow generating systems such as fans or air duct outlets so that the ions are freely emitted into the area to be cleaned without passage of the ions or any air stream carrying the ions through a filter. Thus the particles are separated from the air by a precipitation technique which causes the particles to fall to the floor for collection by conventional house cleaning techniques.

The enclosure which acts as a cage to isolate and define the area/volume required for the application, is considered to be a basic and essential feature of the "clean zone" concept. The design, construction and materials employed, all contribute to ensuring the effectiveness of the system.

Installation of the "Clean Zone" enclosure is simple and flexible and easily fitted retro-actively with the minimum difficulty to accommodate existing equipment.

The light open nature of the enclosure gives little sense of restriction to employees inside the zone and it is generally unnecessary to upgrade lighting levels in the area after the installation of the zone.

The effectiveness of the system is readily measurable and can be demonstrated by the simple action of energizing and de-energizing the AC power input.

The results in regard to the control of fine dust, and reduction of inclusions are fully substantiated in practical cost effective terms by satisfied industrial end users in regard to:
reduced level of rejections due to inclusions;
increased productivity
improved working environment inside and outside the zone.

Preferably the method includes a canopy which assists in directing the particles away from a source of the particles e.g. a dust producing machine towards sides of the machine for precipitation on the floor.

With the foregoing in view, and other advantages as will become apparent to those skilled in the act to which this invention relates as this specification proceeds, the invention is herein described by reference to the accompanying drawings forming a part hereof, which includes a description of the best mode known to the applicant and of the preferred typical embodiment of the principles of the present invention, in which:

BRIEF DESCRIPTION OF THE DRAWINGS

FIG. 4 is a cross-sectional view through an emitter element of a type shown schematically in FIGS. 1 and 2.

FIG. 5 is an isometric view of the emitter element of FIG. 4.

FIG. 12 is an isometric view on an enlarged scale of one portion of a modified emitter for use in place of the emitter of FIG. 9.

FIG. 13 is a transverse cross sectional view through a further embodiment of emitter taken along the lines 13—13 of FIG. 14.

FIG. 14 is a cross sectional view along the lines 14—14 of FIG. 13.

In the drawings like characters of reference indicate corresponding parts in the different figures.

DETAILED DESCRIPTION OF THE PREFERRED EMBODIMENTS

Figure 1:
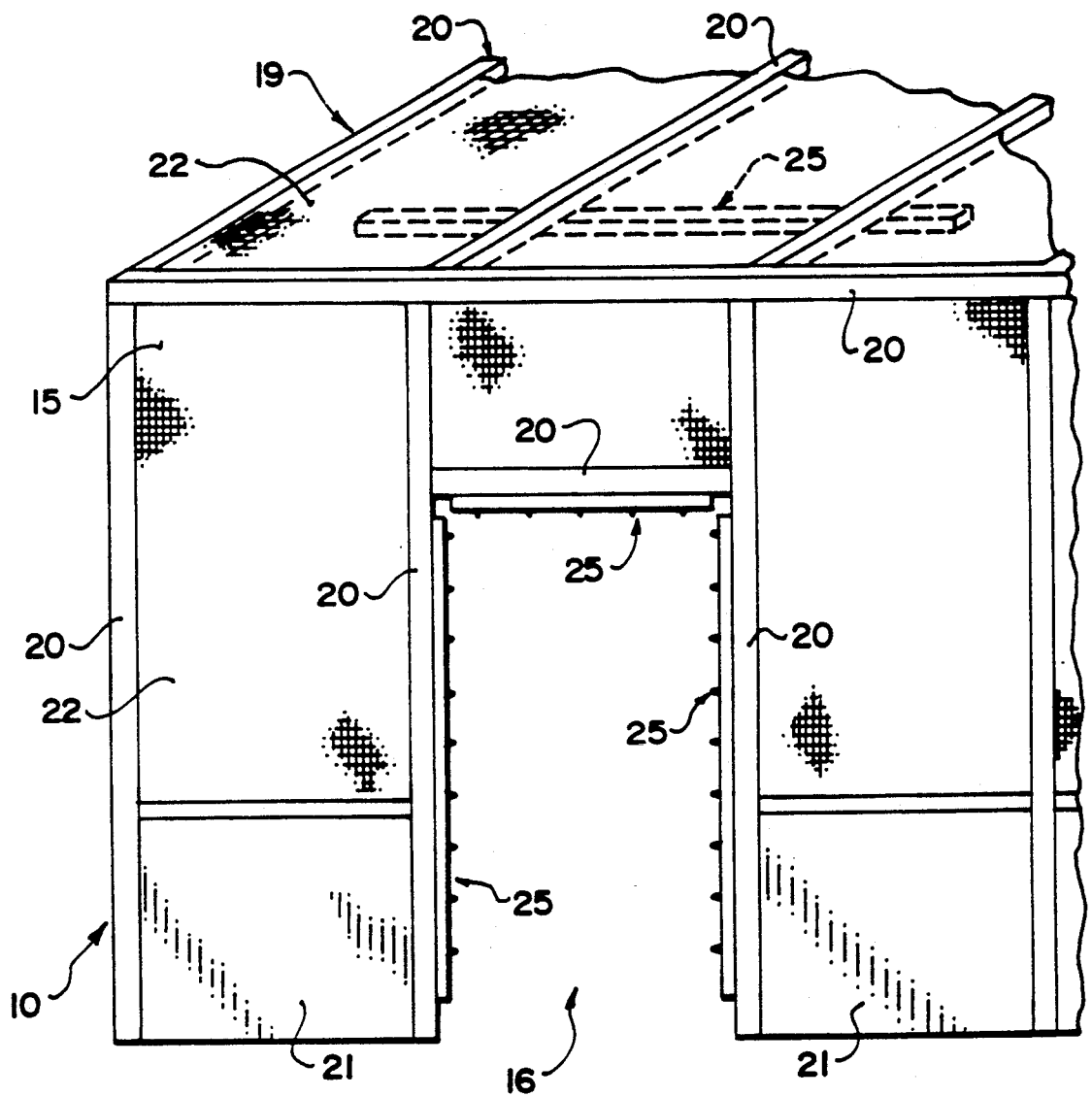
FIG. 1 is an isometric view showing a screen system defining a zone for separation from the remainder of building and including ionization generating elements mounted within the zone.
Figure 2:
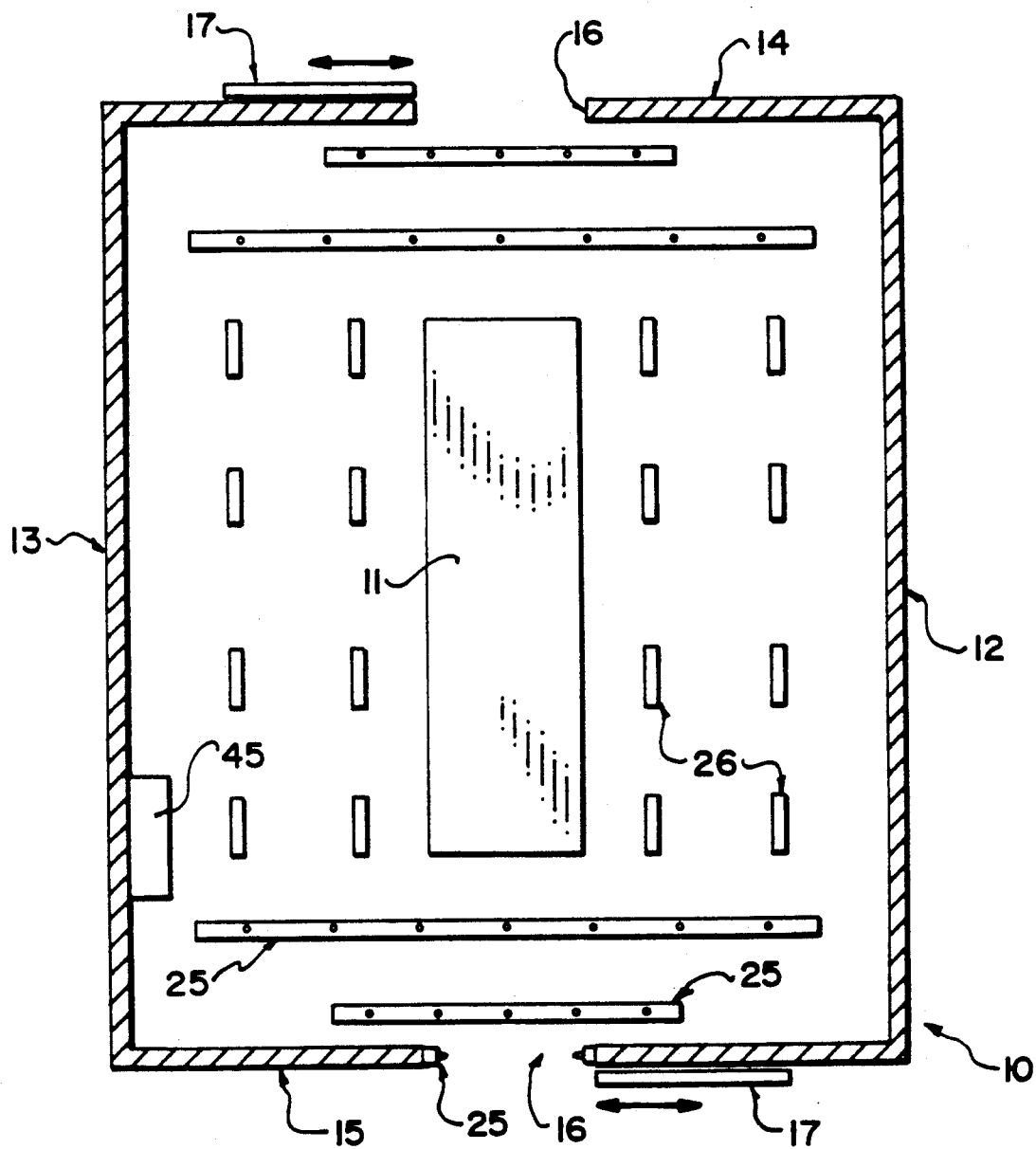
FIG. 2 is a top plan view of the zone of FIG. 1 showing the location of the ion emitters.

In FIGS. 1 and 2 is illustrated a zone defined by a surrounding wall structure generally indicated at 10 within which is mounted a machine 11 which is illustrated schematically and is wholly enveloped by the surrounding wall structure defining the zone.

The wall structure comprises two side walls 12 and 13 together with end walls 14 and 15 each of which includes an opening 16 and a slidable closing door 17. Across the top of the walls is provided a ceiling 19. The height of the walls is arranged to be approximately equal to the minimum working height of the order of eight feet and up to a maximum of the order of ten feet so that the ceiling 19 is generally positioned beneath the roof or ceiling structure of the building and is separate from the lighting, duct work and other utilities which are often provided in structural buildings of an industrial type.

This critical area or zone is enclosed using a slotted metal structure as the main supportive framework, housing panels covered with perforated screen material of a type which is permeable to air and light but is resistant to the passage of dust or other fine particles. One example of material which can be used is known as TAK Barrier Screening. The TAK Barrier Screening is a fine gauge fabric, treated with a special tacky resin. This Barrier screening is electronically compatible with negative ion presence and works harmoniously to create a dust free enclosure, trapping large particles, yet allowing the zone to breathe without any increase in air speeds across the fabric.

The enclosure which acts as a cage to isolate and define the area/volume required for the application is considered to be a basic and essential feature of the "clean zone" concept. The design, construction and materials employed, all contribute to ensuring the effectiveness of the system.

Installation is simple and flexible and easily, fitted retroactively with the minimum difficulty to accommodate existing equipment.

The light open nature of the enclosure gives little sense of restriction to employees inside the zone and it is generally unnecessary to upgrade lighting levels in the area after the installation of the screens.

Strategically located emitters at ceiling level within the enclosure produces a bombardment of negative ions to precipitate particles inside the zone. At the same time a high density is created within the confines of the enclosure which will not allow particles to penetrate the screens, in either direction.

All openings into the zone required for access are protected by a curtain of ions which comprises a peripheral distribution of emitters to form an high density concentration of directed negative ions to precipitate any dust which might otherwise migrate into the area. Altogether a total screened, "cage" effect is produced with a fully isolated Clean Zone separate and distinct from the general working area of the facility.

On completion of a Clean Zone, and activation of the ion generation system, an ultra Clean Zone will be established for process within 24 hours. This protection will be available as long as the system is in operation with the necessary negative ions densities being maintained automatically at the proper levels.

The slotted steel frame work is indicated at 20 and is of a conventional nature available for receiving watt panels and for bug screens. A solid panel is indicated at 21 and the screen material is indicated at 22.

The ceiling is formed in the same structure employing wholly the screen material 22. The enclosure can thus be formed relatively simply by the assembly of the frame work following which the panels are simply flipped into place to define the completed zone. In FIGS. 1 and 2 there is provided a plurality of emitters of negative ions including two separate types of emitters indicated at 25 and 26 respectively. The details of the emitters 25 are shown in FIGS. 6 and 7 and the details of the emitters 26 are shown in FIGS. 4 and 5.

Figure 6:
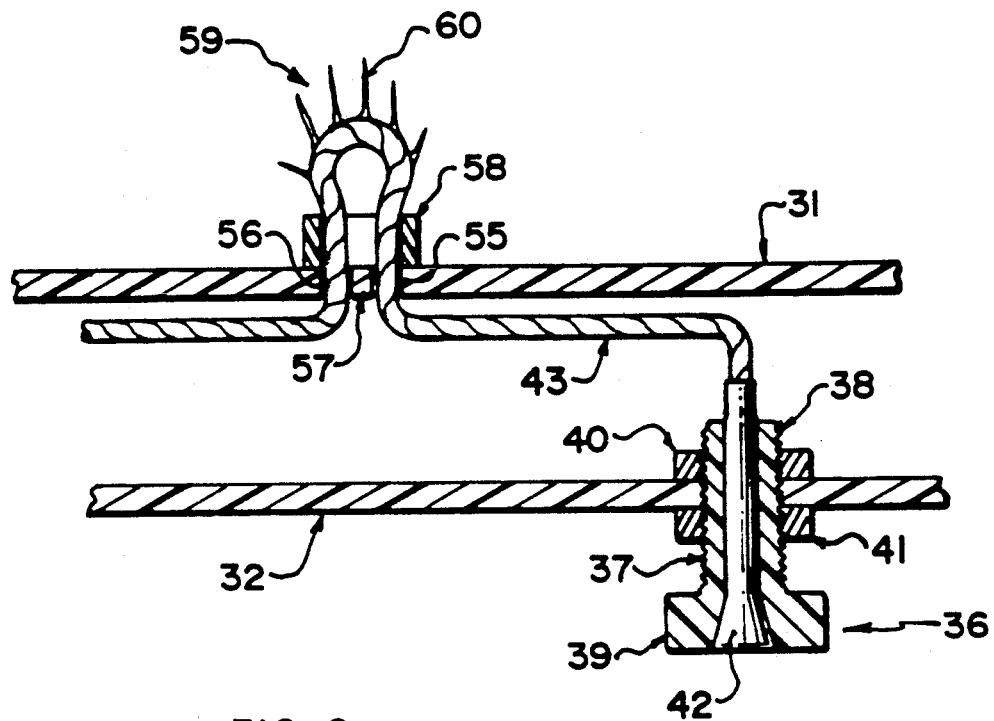
FIG. 6 is a cross-sectional view through a second emitter element of the type illustrated schematically in FIG. 1.
Figure 7:
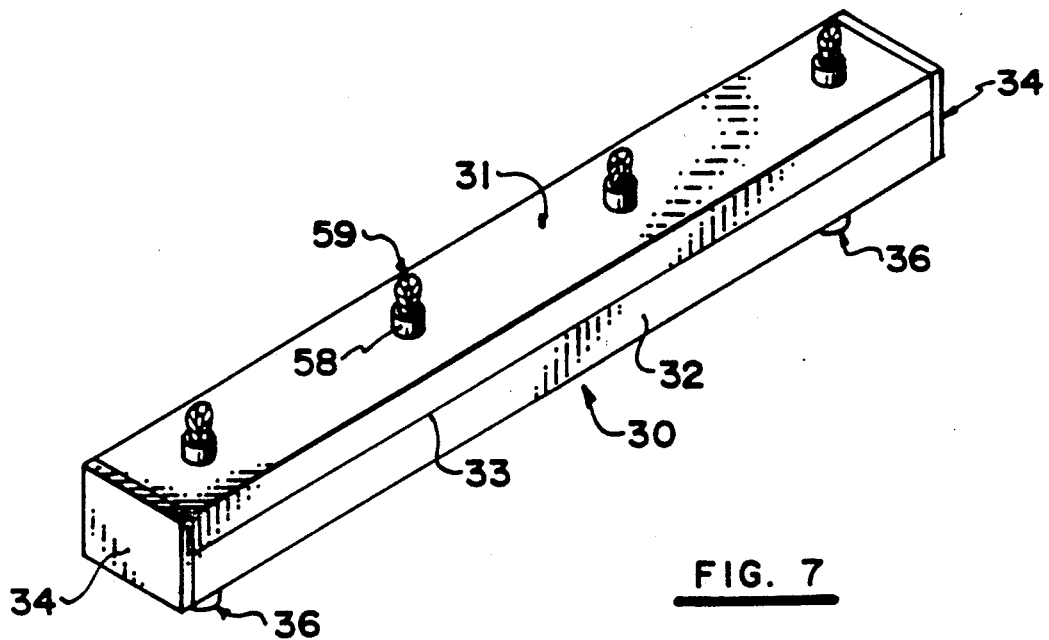
FIG. 7 is an isometric view of the emitter of FIG. 6.

Turning therefore to the emitters 25 shown in FIGS. 6 and 7, this emitter comprises an elongate channel member 30 formed in two halves 31 and 32 which are snap fit together along a joining line 33 to form an enclosed elongate tubular member. End caps 34 are provided of a type shown in FIG. 4 which comprise a press fit into the end of the tubular member thus forming a complete enclosure. The emitter 26 as shown in FIGS. 4 and 5 comprises the same basic housing structure. The length of the housing can be selected according to requirements as shown in FIGS. 4 and 5 the emitter is of a relatively short length whereas in FIGS. 6 and 7 the emitter: 25 can be significantly longer.

Each of the housings includes a connector 36 of a type including a body 37 which has an outer screw thread 38 and an end cap 39. The body can thus be attached through an operating in the housing simply by clamping into place by one or more nuts 40 and 41. In the arrangement shown in FIG. 6 there are two nuts provided each on a respective side of a wall of the housing so as to spare the end cap 39 away from the wall. In the arrangement shown in FIG. 4, the end cap is clamped against the end face of the housing by the nut 40 on the opposed side of the wall of the housing. The housing includes a central bore which carries a conductor 42 and a volume of the sleeve which projects outwardly beyond the inner end of the body to connect to a conductor 43 provided within the housing. The tubular connector 42 is thus of a type which can receive simply a single pole connector by which high voltage from a generator 45 (FIG. 2) can be connected to the emitter with a plurality of emitters arranged in series by connection of a wire from each to the next.

The conductor 43 is formed of a yarn of a conductive fibre material for example carbon fibres which are cut into staple fibres and then spun and twisted to form a multi fold yarn. The housing is formed of very suitable insulating plastics material so that the conductor yarn call simply be threaded into the housing and can rest against the housing without forming a short circuit.

In FIGS. 4 and 5, a front face of the emitter which is defined by the upper face of the upper pact 31 has a plurality of openings 48 substantially equidistantly spared along the front face in a single line across the centre of the front face. The yarn is then threaded simply in a stitch pattern so that portions of the yarn are exposed on the outer side of the front face and portions of the yarn are maintained on the inner side of the front face that is within the housing as indicated at 49 and 50 respectively.

This form of emitter is substantially multi-directional so that when a high voltage of the order of 6000 volts is applied to the conductor 43 the exposed portions 49 of the yarn generate a corona effect causing the creation of ions in the area of the corona effect with those ions tending to escape from the exposed portion of the yarn 49 in all directions away from the front surface. The ions thus tend to spread away from the emitter in all directions and to attach to particles within the air. As the particles are heavier than air the particles tend toward the ground surface and in view of the generally positive charge on the ground surface, the negatively charged particles are attracted to the ground surface and fall to the ground surface for collection on the ground surface both in view of gravity and in view of the electrostatic attraction.

As shown in FIG. 2, the emitters 26 are arranged in array around the centre of the zone. In the example shown there are four rows of the emitters arranged substantially equadistantly spared across the width of the zone. In this way the full area of the interior of the zone is bombarded with the ions which are spread equally throughout the central area of the zone. As shown in FIG. 1 the emitters 26 are mounted at the ceiling area on suitable supports (not shown). This places the height of the emitters generally at the height of the ceiling which would be in the order of eight to ten feet from the ground which has been found to be particularly effective since the ions are thus prevented from dissipation to other areas of the building before they can carry out their function of attachment to particles and transporting those particles to the around surface.

The emitter 25 shown in FIGS. 6 and 7 is modified relative to the emitter 26 in that the conductor 43 is confined into short portions which project outwardly from the front face of the channel member 31. Thus the front face 31 includes for each portion a pair of holes 55 and 56 which are closely positioned together with only a narrow separating portion 57. The conductor is then threaded through the holes 55 and 56 and passes through a collar member 58 surrounding the holes and supporting the outerly projecting portion of the conductor 43 as indicated at 59. The collar member 58 can be bonded to the front surface of the channel member or can comprise a separately manufactured product which insects from an underside of the upper surface of the channel member through a single hole in the wall 31 and provides by itself the proper support for the projecting portion 59.

The projecting portion 59 is confined to a short length of the front face of the channel member is caused to turn back upon itself at a sharp angle. This tends to cause individual ones of the staple fibres 60 to project outwardly from the yarn at the point where it is turned sharply thus forming a plurality of spikes which project outwardly from the sharply turned portion of the conductor 43. These spikes have been found to generate ions in a highly directional manner in that the ions are preferentially generated at the apex of the fibre spike and thus tend to be emitted in a direction generally at right angles to the front face.

The emitter 25 is therefore much more directional than the emitters 26. In view of this property, the emitters 25 are thus arranged to generate a curtain of ions lying in a plane longitudinal of the emitter 25 and at right angles to the front face.

Turning therefore to FIG. 1 the emitters 25 are mounted around the opening 16 along the sides of the opening and along the top of the opening with the emitters facing inwardly to generate a curtain across the plane of the opening of a high concentration of ions. This curtain acts to "attack" any dust particles attempting to pass through the opening so that those particles are acted upon quickly and tend quickly to fall to the around at the area of the opening. As a back up for the emitters 25 at the opening, one or more rows of further emitters 25 can be positioned inwardly of the opening. Thus in FIG. 2 there are two further rows of emitters one positioned just inside the opening and the next behind the first thus forming three curtains of ions acting specifically on the dust tending to move through the opening carried by persons or equipment passing through that opening or by air movement through the opening.

The curtain of ions thus act at the openings in the zone and in addition the general level of ions within the zone acts in cooperation with the permeable tacky screen to cause dust and other particles to be collected at the screen rather than to pass through the screen. It has been noted that the ions have a tendency to act upon the dust just outside of the screen so that large quantities of particles fall to be collected on ground or other horizontal surfaces just outside the screen thus preventing the dust from passing through the screen.

Figure 3:
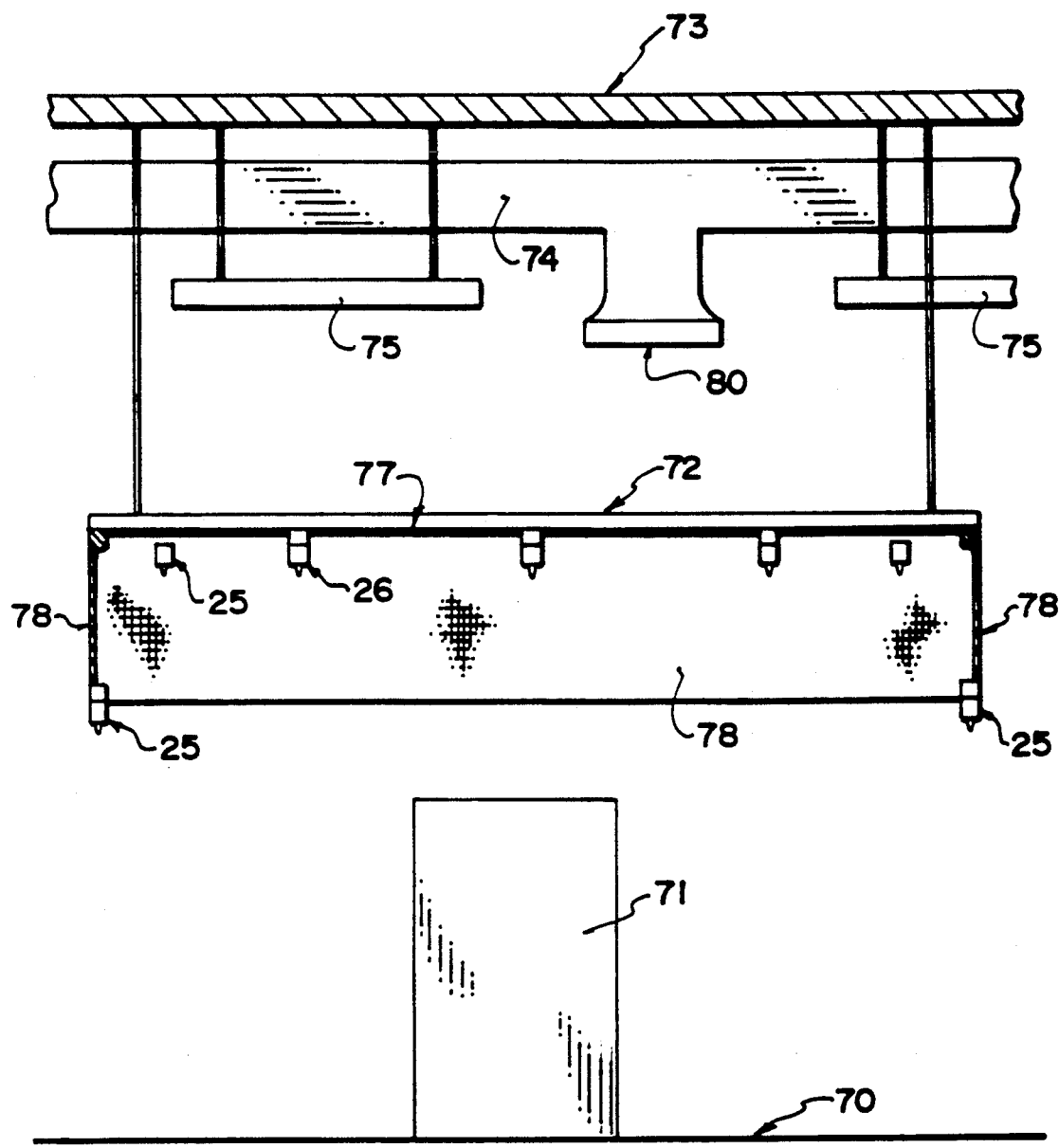
FIG. 3 is a cross-sectional view showing a modified arrangement of screen assembly defining a zone within a building.

As shown in FIG. 3 there is provided a modified arrangement including a floor surface 70, a machine 71, a screen 72, an upper ceiling 73 of the building and utilities including duct work 74 and lighting 75.

In this case the screen is modified in that it comprises simply a canopy supported from the ceiling or roof on support wires 76. The canopy includes a ceiling 77 formed in panels similar to the ceiling 19 together with four side wall portions 78 which hang down from the side edges of the ceiling. The details of the construction are not shown but are similar to that shown in FIG. 1. This of course leaves the side walls of the zone open for passage of persons or equipment but generates enough of a separation of the zone from the building to enable the cleaning of dust from around the machine 71. FIG. 3 also illustrates the arrangement in which the zone is separated from the ventilation systems including the duct work 74 and from the lighting systems which are maintained without modification in the building. The light into the zone is thus provided by the conventional lighting of the building. The ventilation or air movement within the zone is provided by the conventional building ventilation systems including the duct work 74 and a nozzle 80 which projects air to move downwardly through the screen and into the zone.

In the arrangement of FIG. 3, the dust is prevented from passing into the interior of the zone through the open side walls by the generation of a curtain of ions similar to that at the opening 16. Thus the emitters 25 are positioned so as to generate a curtain projecting downwardly at the open side walls and this can be backed up by one or more further rows of emitters 25 positioned inwardly of the side walls. Also similar to the construction shown in FIGS. 1 and 2, interior emitters can be of the type illustrated at 26 to generate a more even spread of ions throughout the zone.

In FIGS. 1 and 2 the machine 11 illustrated schematically comprises a machine for carrying out an industrial process of a type which requires very clean air for example a paint spraying machine or pact molding machine so that this machine is maintained within a clean zone in which the dust in the remainder of the building is kept outside of the zone and is prevented from entering the zone and from remaining within the zone once it has entered. The clean zone must of course be backed up with good housingkeeping practices which will not be explained in detail here.

In the arrangement shown in FIG. 3, the zone is effectively a "reverse clean zone" in which the machine 71 is of a type which generates high levels of dust, for example a paper cutting machine or a textile spinning machine. In this case the machine itself is surrounded by a zone which protects the remainder of the building from receiving the high quantities of dust generated by the machine itself. In this way instead of maintaining the whole of the building cleaned, it is only necessary to clean the area surrounding the machine concerned so that the dust from that machine is prevented from escaping to the remainder of the building and is also contained within that area by the action of the negative ions in the dust particles and the tendency to precipitate and thus to collect on the ground surfaces from which they can be readily removed by normal housekeeping systems.

The emitters are entirely free from any forced air effect so that neither the ions nor any particle laden air passes through a filter. Thus the negatively charged ions collect onto the particles causing them to conglomerate and to precipitate onto the floor. The floor thus acts as a collector for the particles and this can be readily cleaned by conventional housekeeping practices. In addition, the tendancy of the particles at the area above the machine is to rise so that the bombardment of the particles in the air space of the canopy with the ions causes the particles to tend to flow outwards of the machine and to precipitate out onto the floor at the sides of the machine.

The details of the electrical equipment generating the high voltage are not shown as these are well known to one skilled in the act. In addition the wiring connections and the necessary conduit are not shown.

As an alternative arrangement for use in some building structures, the emitter 25 can be used at the exit nozzle of the ventilation duct work so that the ions are directed into the air stream which passes through the nozzle as the air emerges from the nozzle and is communicated into the building. The use of the emitters in the elongate or strip form enables the emitters to be tailored to the specific nozzles concerned by simply cutting to length or selection from a number of available lengths and attachment at the nozzle.

Figure 8:
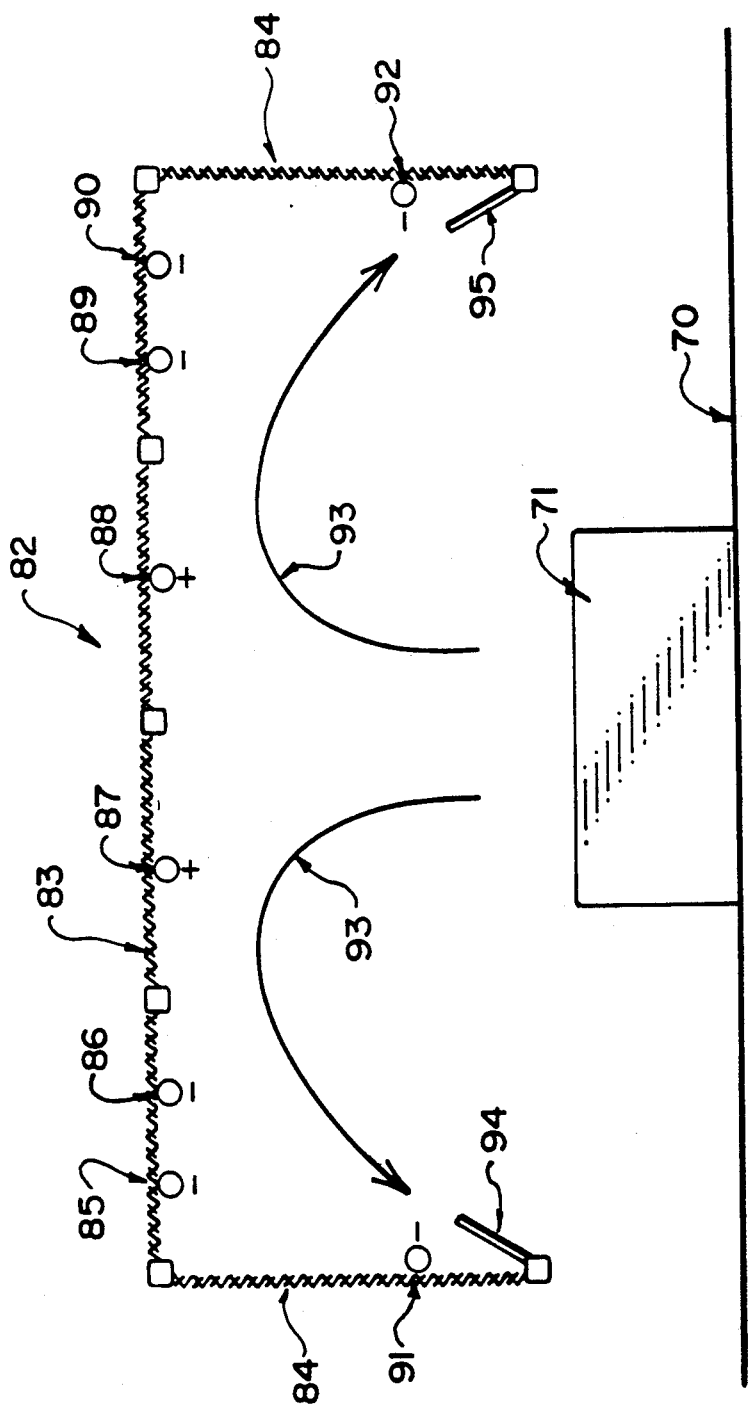
FIG. 8 is a cross sectional view showing a modified arrangement of the screen assembly of FIG. 3.

Turning now to FIG. 8, there is shown a canopy arrangement similar to that of FIG. 3 including the source 71 mounted upon the floor surface 70 and including a canopy generally indicated at 82. The canopy is again formed including a ceiling portion 83 and depending side walls 84 arranged around the periphery of the ceiling and depending therefrom to a position at a height from the floor sufficient to allow persons and machinery to pass under without obstruction.

In this case the canopy is modified by the addition of two elements.

Firstly the ion emitters of the type generally described above are provided in six rows indicated at 85, 86, 87, 88, 89 and 90. The two central rows 87 and 88 positioned above the row 71 are arranged instead of the previously described negative ion emitters to provide emission of positive ions. The construction of the device is substantially identical to that previously described but the electrical controls provide a positive voltage for emission of the positive ions from the fibrous conductors.

Outside of the vertical area above the source are provided the rows 85, 86 and 89, 90 positioned closely adjacent the sides of the rectangular canopy. These emitters are of the negative ion type previously described.

In addition two further rows of emitters 91 and 92 are provided located at a position approximately halfway down the side walls 84 from a ceiling to the floor. In a practical example, the canopy can have a ceiling height of twenty feet in which case the rows 91 and 92 will be positioned at a distance of approximately ten feet from the ground. The lowermost edge of the side walls is then positioned approximately six and one half feet from the around to allow ready clearance. The emitters 91 and 92 are arranged to emit negative ions.

This arrangement of the emitters tends to generate a flow of the particles indicated by the arrows 93 in which the particles rise from the source 71, move outwardly under the canopy and then precipitate downwardly toward the floor adjacent the sides of the canopy. This tendancy is enhanced by the positive ion emitters at the central area and in addition the tendancy of the air to rise over the source in view of the fact that the source tends to generate heat and air flow due to various moving pacts. The shape of the canopy and the location of the negative ion emitters then tends to turn the particles to move outwardly and downwardly for precipitation downwardly toward the floor 70.

To provide an additional collection of the particles, these is provided a pair of collection surfaces 94 and 95 each arranged along a respective longitudinal side edge of the canopy. Each collection surface comprises a simple shelf type element extending outwardly and connected from the lower most edge and inclined upwardly therefrom and inwardly of the canopy to define between the wall 84 and the shelf element a V-shaped area in which the particles tend to collect. The negative ion emitters 91, 92 positioned just above the shelf element also assist in the collection of the particles in that area.

Automatic extraction devices may be provided in the V-shaped area for continual removal of the particles collecting in that area. For example vacuum arrangements may provide along the length of the collection zone for extraction of the particles as they precipitate into the V-shaped area.

In a further modification of the emitters (not shown), each emitter is formed as a module in which the electrical supply unit for the module is connected to the end of the channel section forming the emitter. In this case the channel section forming in the emitter from which the electrodes protrude can have a length of the order of the eight feet and be directly connected to its own electrical supply and control unit. The modules can then be suspended from the ceiling of the canopy with a number and arrangement of the modules being selected according to design requirements. This arrangement has the advantage that the wiring necessary for insulation can now be provided by the conventional electrical supply system at conventional voltages within the building and is no longer necessary to provide high voltage wiring which requires different safety constructions.

Figure 9:
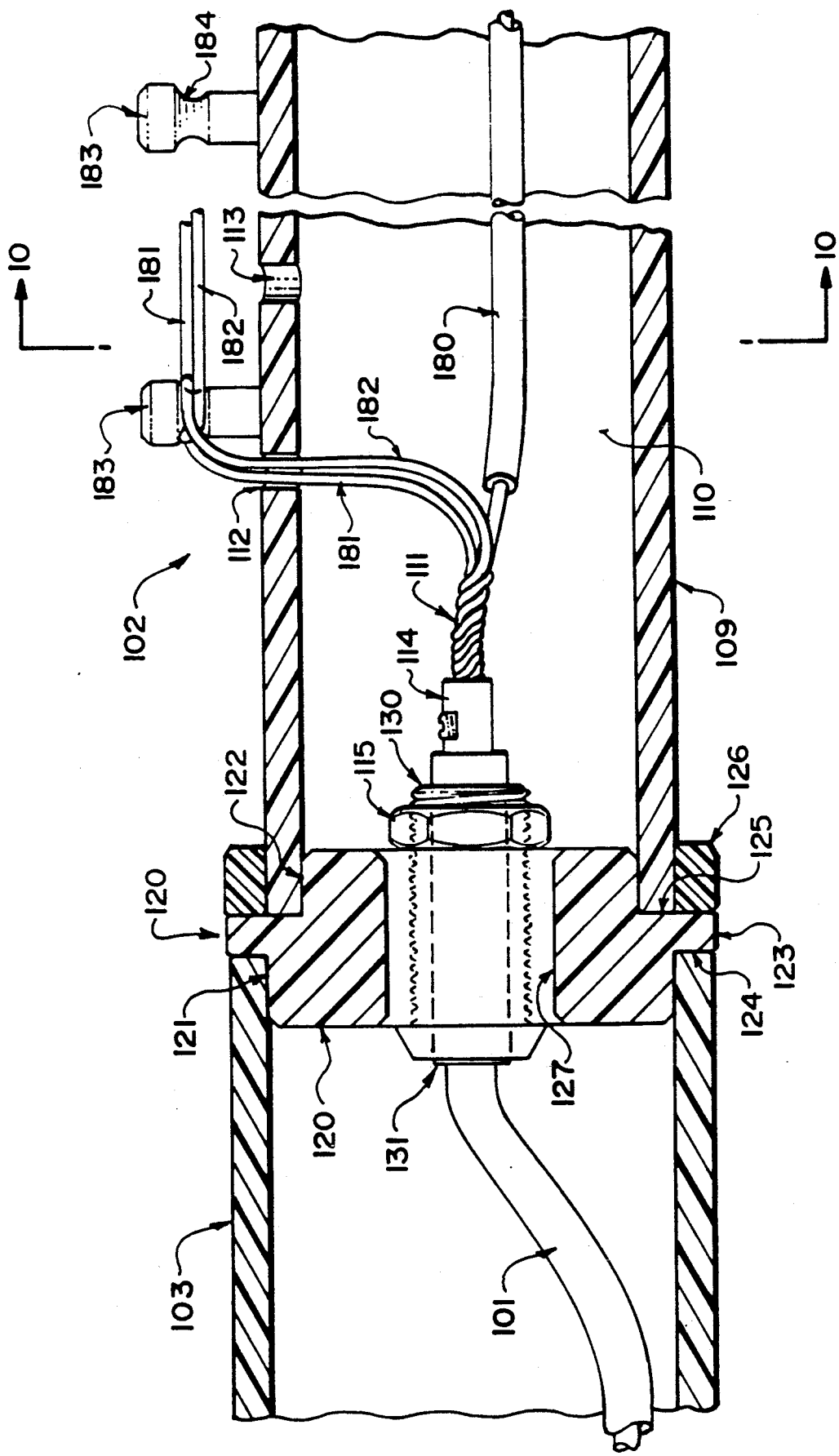
FIG. 9 is a cross sectional view showing one end of a conduit, the adjacent end of an emitter and the connector element therebetween.
Figure 10:
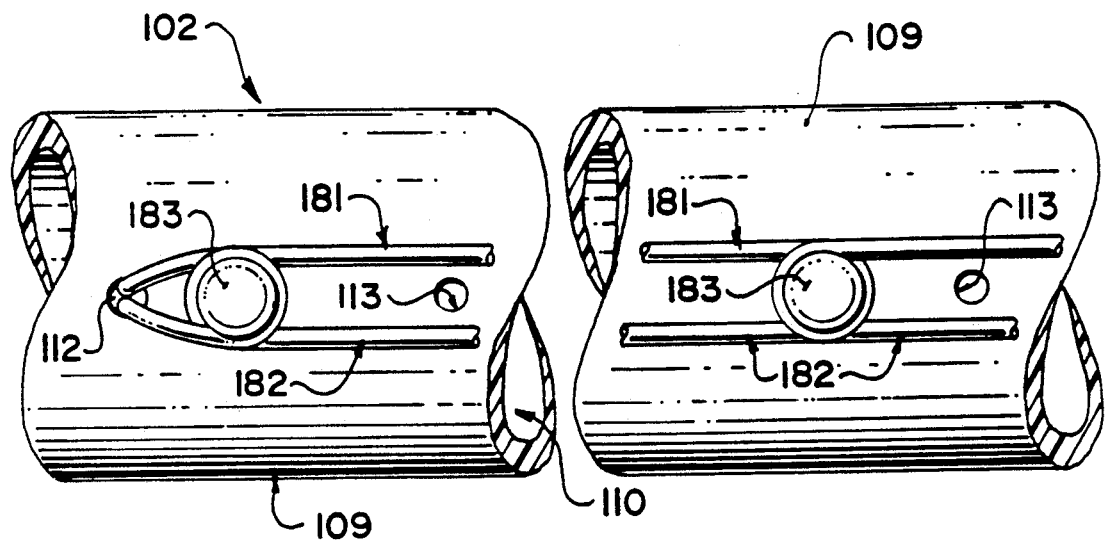
FIG. 10 is a cross sectional view along the lines 10—10 of FIG. 9.
Figure 11:
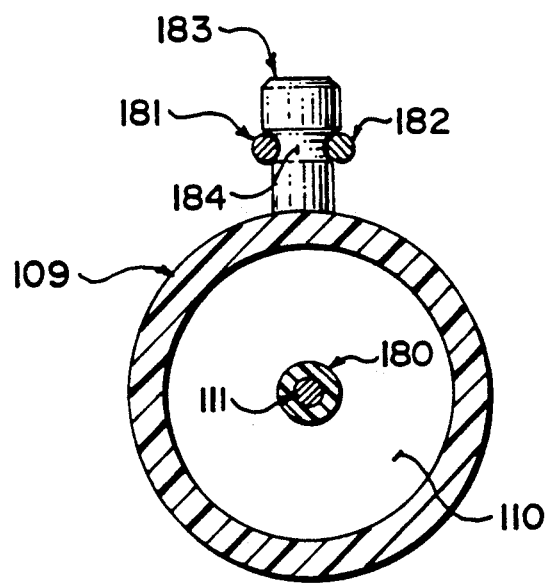
FIG. 11 is an top plan view of one portion of the emitter of FIG. 9.
Figure 15:
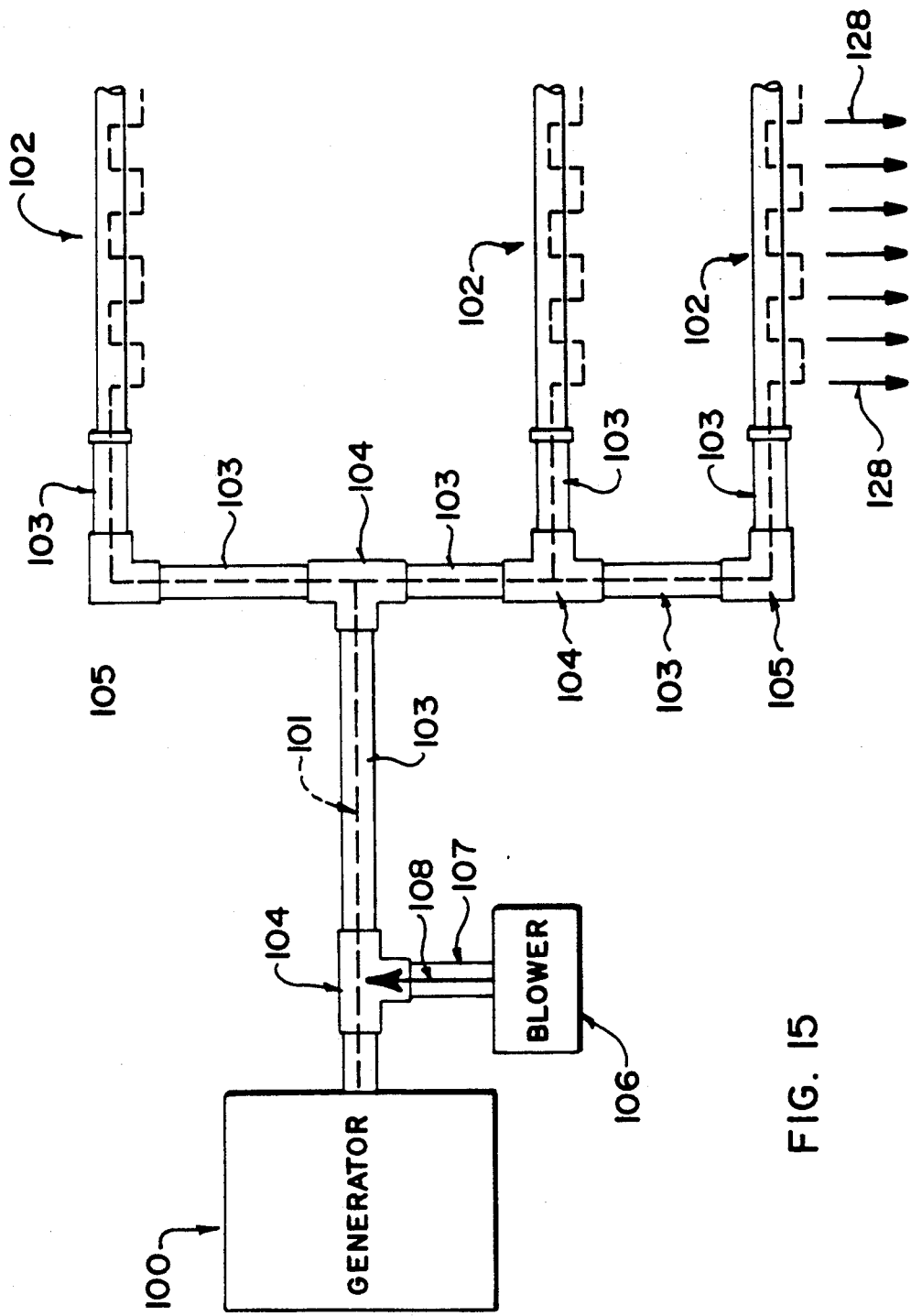
FIG. 15 is a schematic illustration of an emitter system including the conduits and emitters of the type shown in FIGS. 9 or 12.

Turning now particularly to FIGS. 9, 10 and 11, there is shown an alternative system of emitter. In FIG. 15 the whole system is shown and comprises a high voltage generator 100 which provides a high voltage on an output cable 101 for communication to the various conductors of the emitters indicated at 102. Each of the emitters is of the type shown in FIGS. 9, 10 and 11. In order to meet required electrical codes, the high voltage cable 101 is received within a conduit system including conduit elements 103, T connections 104 and angle connections 105. The system further includes an air blower 106 providing high pressure air along a conduit portion 107 for injection along the line of an arrow 108 into the conduit system at one of the T fittings 104.

One portion of the conduit is shown in FIG. 9 and comprises simply a portion of conventional PVC tube which is circular in cross section and forms an extruded tube and is readily commercially available for an electrical conduit. The cable 101 thus extends along the length of the conduit.

The emitter 102 is similarly formed from a length of PVC conduit material which again is in the form of an extruded tube thus forming a peripheral wall 109 which surrounds a hollow interior 110. A first conductor 111 extends along the hollow interior 110 so that the conductor is housed within the hollow interior and is thus confined by the electrically insulating peripheral wall 109. The first conductor 111 is also electrically insulated as indicated at 180. The circular cylindrical peripheral wall is however drilled to form a first opening 112 and a plurality of openings 113 with the openings 113 being arranged at spaced positions along the length of the tube.

The tubular emitter body 109 is connected to the tubular conduit 103 by a connector 120. The connector includes a first cylindrical portion 121 defining an outer surface which is a sliding fit within the conduit 103 so that it can be pressed into the conduit. The connector further defines a cylindrical portion 122 which is shaped to act as a press fit within the interior surface of the emitter body 109. An intervening flange member 123 projects outwardly from the portion 121 and defines thus on one side a shoulder 124 for engaging the end of the conduit and on the other side a shoulder 125 for engaging the end of the emitter body. The emitter body can thus be connected to the conduit simply by pressing each onto the end of the connector element 120. A sealing ring 126 is provided outside the end of the emitter body and abutting the shoulder 125 to prevent or reduce the escape of air from the interior of the emitter body.

A hollow bore 127 is provided through the connector element 120 to allow the transmission of air from the interior of the conduit 103 into the emitter body. In this way as shown in FIG. 15 the conduits and the emitter body themselves act to transport air from the blower 106 into the emitter bodies for ejection through the openings 112, 113 as shown by the arrows 128 in FIG. 15. The air thus generated by the blower 106 provides an air flow in a direction away from the emitter bodies to assist in carrying the ions thus generated by the conductor away from the emitter bodies to increase ion generation and to provide fresh air into the system. The blower 106 may be connected to a fine filtration system so that the air supplied to the system is particle free.

The connector element 120 also carries an electrical connector 130 which carries a socket 131 at one end for connection to a male coupling at the end of the cable 101. Electrically connected to the socket (not shown) is a connector member 114 to which an end of the conductor 111 is attached. A nut 115 clamps the connector element 130 into the bore of the connector member 120.

The high voltage supplied to the connector 114 and connected to the first conductor 111 is also supplied to a second conductor 181 and third conductor 182 which are connected together with the connector 111 at the end 114. This connection is obtained by a intimate wrapping of the first, second and third conductors at the connector 114 together with a wrapping metal wire wrapped or braided around the connecting conductors, all of which is encased with a heat shrink insulating wrapping material.

The conductors 181 and 182 are formed of a carbon fiber fibrous yarn arrangement previously described. The second and third conductors extend through the hole at 112 to the exterior of the tubular support 109. On the exterior surface, the conductors 181 and 182 are carried on a plurality of spaced support pins 183 mounted on the surface of the support tube and extending radially outwardly therefrom. The pins have a diameter at a reduced waist portion 184 of the order of ¼ to ½ inch and preferably of the order of 5/16 inch. The conductors emerging from the opening 112 are firstly wrapped around the adjacent pin 183 at the waist portion and then are carried by the pin to the next pin each on a respective side of the pins so that the conductors 181 and 182 extend in parallel lines from each pin to the next with the conductors being wrapped around the waist portion at each pin to provide a tensioning or capstan effect. Thus the conductors are supported at a position spaced outwardly from the outer surface of the support tube and are held in parallel relationship at a spacing of the order of 5/16 inch.

At the opposed end (not shown) of the support tube, there is a provided a similar connection between the second and third conductors which pass through a further opening into the interior of the support tube and are then connected to the opposed end of the first conductor 111.

This arrangement has been found to provide a high level of ion emission which is consistent along the length of the conductors. The additional first conductor 111 which is insulated and retained within the tubular support acts as a stabilizing conductor to ensure consistent ion emission along the length of the second and third conductors. The second and third conductors are supported away from the support tube so that the full exterior surface of each conductor is available for the emission of ions. The provision of more than one conductor and preferably the two conductors as shown has been found to provide an increased ion emission effect. The air flow generated by the air flow through the outlet holes 113 also assist in carrying the ions away from the support tube.

In FIG. 12 is shown a similar arrangement including the support tube 109, the first conductor 111, the second and third conductors 181 and 182 and the air discharge openings 113. In this arrangement however the support pins have been replaced by support blocks 186 attached to the outside surface of the support tube 109 and thus defining a planar surface spaced outwardly from the support tube with the planar surface lying in a common planar surface which is common to all of the support blocks 186. The conductors 181 and 182 are then laid across the common planar surfaces of the support blocks and are attached thereto so that the conductors are supported in the above described parallel space relationships supported away from the outside surfaces of support tube 109. The support blocks 186 are attached to side wall elements 187 and 188 which stand outwardly from the support tube 109 and thus define a channel surrounding and confining the conductors 181, 182 and the outer openings 113. This channel acts to assist in directing the ions movement away from the support tube along with the air flow which is generated from the outlet opening 113. The device therefore acts as a "air knife" in which a sheet of moving air and ions is generated lying in an axial plane of the support tube 109.

In FIGS. 13 and 14 is shown an alternative arrangement of emitter. The emitter comprises an emitter body generally indicated at 150 which can be used in the system of FIG. 15 to replace the emitter body 109. In this construction there is provided a cylindrical wall 151 which surrounds a hollow interior 152 for the transmission of air and the release of that air through openings 153. In this embodiment the wall 150 instead of being formed wholly from extruded PVC, includes an embedded metallic foil layer 154 which is of circular cylindrical shape and is recessed from the outer surface 155 of the wall and also from an inside surface 156 so that it is electrically isolated. In this case the conductor comprises the metallic foil layer 154 together with a plurality of pins 160 which are fixed in place by penetration through the wall 151 so as to project outwardly from the outer surface 155. The penetration of the needle 160 through the wall punches the metallic foil layer and brings the needle into electrical connection with the metallic foil layer thus forming the needle into part of the conductor. The needle has a sharpened outer end 161 which acts as an effective emitter. This type of construction can be used in places where the needle type emitter is preferred and can simply replace the emitter body 109 in the collection of components necessary for forming the emitter system.

The emitter body as shown in FIGS. 9 and 10 is of circular cross section as such tubular piping is readily commercially available. However other custom cross sectional shapes are possible and can be designed to provide a particular presentation surface for the front face of the emitter body for supporting the emitter conductor.

In a further arrangement, the fibrous conductor is mounted on the emitter body so that it is supported away from the emitter body by a plurality of raised support elements positioned at spaced locations along the length of the emitter body. Thus the fibrous conductor passes through a first opening in the emitter body to be presented at the front face of the emitter body and then extends along the length of the emitter body at the front face and is supported away from the front face by a plurality of raised support elements. The full periphery of the fibrous conductor is thus accessible to the air to release ions from the full periphery and to allow air movement around the full periphery.

In FIG. 14 is shown a further example of emitter element which comprises an elongate needle portion 170 to which is attached a clamping collar 171 which receives a plurality of loops 172 of the conductive fibrous material described previously. The loops project outwardly from the clamping collar 171 and are spread apart by the normal resilience of the fibrous material. The conductive pin 170 communicates with the electrical supply, in this case the layer 154 and communicates the high voltage to the fibrous conductor for emission of the ions.

The emitter element of the type shown in FIG. 14 can have the advantage that it is readily flexible allowing it to be formed into a curved or circle to follow the contours of a required location. This curvature can be achieved by flexing the element due to the flexibility of the plastics insulating material and the flexibility of the foil layer without fracturing the foil layer.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. An emitter of charged ions for releasing to the air comprising an elongate tubular pipe having an elongate hollow interior therealong surrounded by an elongated peripheral wall and extending from a first end to a second end, a first conductor mounted within the hollow interior and extending from the first end to the second end, means defining a plurality of openings in the peripheral wall at longitudinally spaced positions along the peripheral wall, a second conductor formed of a fibrous yarn extending from said first end through one of said openings, such that at least a portion of the second conductor is exposed on an outer surface of the peripheral wall, through a second of said openings to said second end, and connector means for connecting a high voltage to the first conductor and the second conductor in parallel such that the exposed portion of the second conductor generates ions in the air surrounding the peripheral wall.

2. The emitter according to claim 1 wherein the peripheral wall is circular cylindrical in shape.

3. The emitter according to claim 1 wherein the peripheral wall is an extruded tube.

4. The emitter according to claim 1 including a third conductor formed by a fibrous yarn and mounted such that at least a portion thereof extends along the outside of the peripheral wall parallel to the second conductor.

5. The emitter according to claim 4 wherein the second and third conductors are supported on support members extending outwardly from the outside surface of the peripheral wall.

6. An emitter of charge ions for releasing into the air comprising an elongated tubular pipe defining an elongated peripheral wall surrounding an elongate hollow interior, the peripheral wall having at least an outside thereof formed from an electrically insulating material, conductor means extending along the tubular pipe and supported thereby, the conductor means including at least a portion thereof extending outwardly of the outside surface such that said portion of the conductor is exposed outside of said outside surface of the peripheral wall for the emission of ions therefrom, connector means for connecting a high voltage to the conductor means such that the exposed portion generates ions in the air surrounding the outside surface, means defining a plurality of openings in the peripheral wall at longitudinally spaced positions along the peripheral wall, and, means for supplying air into the pipe, the pipe being arranged for transmission of the air along the pipe and for escape of the air through at least some of said openings such that the air escaping from said openings generates an air stream moving away from the pipe.

7. The emitter according to claim 6 wherein said connector means includes a high voltage cable for communicating the high voltage from a generator to the conductor means, conduit means for housing the high voltage cable, said means for supplying air being arranged to transmit air through said conduit means to said pipe.

8. An emitter of charged ions for releasing into the air comprising an elongated member defining an elongate wall formed from an electrically insulating material, conductor means extending along the elongate member and including portions thereof extending outwardly of the elongate wall such that said portions of the conductor are exposed outside of said elongate wall, said elongate members including at least a portion thereof forming a tubular pipe portion arranged at at least one end thereof, connector means for connecting a high voltage to the conductor means such that the exposed portions generate ions in the air surrounding the outside surface, said connector means including a high voltage cable for communicating the high voltage from a generator to said conductor means, conduit means for housing the high voltage cable and a connector element having surfaces thereon arranged to directly engage with the pipe portion and the conduit means.

9. The emitter according to claim 8 wherein the connector element includes a first portion having an outer surface shaped and arranged for insertion as a sliding fit into the conduit means and a second portion having an outer surface shaped and arranged to enter as a sliding fit into said pipe.

10. The emitter according to claim 9 wherein each of said first and second portions includes a shoulder thereon engaging an end face of a respective one of the pipe and the conduit means.

11. The emitter according to claim 8 wherein the connector element includes electrical connection socket therein for receiving a male connector of the high voltage cable and an attachment element electrically connected to said socket for receiving an end of the conductor.

12. The emitter according to claim 8 including means for supplying air for transmission along said conduit and wherein the connector element includes an opening therein for communication of the air from the conduit means to the pipe.

13. The emitter according to claim 10 including a sealing ring engaged around an outside surface of the pipe at a position thereon aligned with said second portion.

14. The emitter according to claim 10 wherein the first portion and the second portion are coaxial and are spaced by a radially outwardly extending flange member arranged therebetween with one side surface of the flange member defining a first of said shoulders and a second side surface of the flange member defining a second of said shoulders and including an electrical socket in one end face of the connector element facing into said conduit means connected to said high voltage cable and an attachment element extending from a second end face of the connector.

15. The emitter according to claim 8 wherein the conduit means and the tube are both of circular cross section.

16. An emitter of charged ions for releasing into the air comprising an elongate tubular pipe defining an elongate peripheral wall surrounding an elongate hollow interior, the peripheral wall having at least an outside surface thereof formed from an electrically insulating material, conductor means extending along the tubular pipe and including portions contained within said insulating material outside surface, the conductor means including at least portions thereof extending outwardly of the outside surface such that said portions of the conductor are exposed outside of said outside surface of the peripheral wall, connector means for connecting a high voltage to the conductor means such that the exposed portions generate ions in the air surrounding the outside surface, the conductor means comprising a cylindrical conductive layer received within said outer surface of the peripheral wall and substantially coaxial therewith and a plurality of transversely extending elongate conducting elements penetrating the outer surface of the peripheral wall and engaging the conductive layer.

17. The emitter according to claim 16 wherein the elongate elements comprise needles.

18. The emitter according to claim 16 wherein the conductive layer is embedded within the peripheral wall.

* * * * *